United States Patent
Riffle et al.

(10) Patent No.: US 8,943,798 B2
(45) Date of Patent: Feb. 3, 2015

(54) METHODS AND SYSTEMS FOR AMMONIA SLIP DETECTION

(71) Applicant: Ford Global Technologies, LLC, Dearborn, MI (US)

(72) Inventors: Chris Riffle, Brighton, MI (US); Frank M. Korpics, Belleville, MI (US); Michiel J. Van Nieuwstadt, Ann Arbor, MI (US); Devesh Upadhyay, Canton, MI (US); John Paul Bogema, Flat Rock, MI (US); Jeff Reich, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 13/650,967

(22) Filed: Oct. 12, 2012

(65) Prior Publication Data

US 2014/0102077 A1    Apr. 17, 2014

(51) Int. Cl.

| F01N 3/00 | (2006.01) |
| F01N 3/10 | (2006.01) |
| F02M 25/03 | (2006.01) |
| F01N 3/20 | (2006.01) |
| F02M 25/07 | (2006.01) |
| F01N 11/00 | (2006.01) |

(52) U.S. Cl.
 CPC .............. *F01N 3/208* (2013.01); *F02M 25/07* (2013.01); *F01N 3/2066* (2013.01); *F01N 11/00* (2013.01); *F01N 2900/1616* (2013.01); *F01N 2560/026* (2013.01); *F01N 2900/1812* (2013.01); *F01N 2560/021* (2013.01)

USPC ............... 60/276; 60/274; 60/278; 60/295; 60/301

(58) Field of Classification Search
 CPC ....... F01N 3/2066; F01N 3/208; F01N 11/00; F01N 2560/021; F01N 2560/026; F01N 2900/1616; F01N 2900/1812; F02M 25/07; F02D 2041/1468
 USPC ............... 60/274, 276, 278, 285, 295, 301
 See application file for complete search history.

(56) References Cited

U.S. PATENT DOCUMENTS

| 8,020,374 | B2 | 9/2011 | Walz et al. | |
| 2005/0282285 | A1* | 12/2005 | Radhamohan et al. | ......... 436/55 |
| 2009/0301066 | A1 | 12/2009 | Sindano et al. | |
| 2010/0115918 | A1 | 5/2010 | Sawada et al. | |
| 2011/0099977 | A1 | 5/2011 | Takahashi | |
| 2012/0285143 | A1* | 11/2012 | Sun et al. | ......... 60/274 |

\* cited by examiner

*Primary Examiner* — Audrey K Bradley
(74) *Attorney, Agent, or Firm* — Julia Voutyras; Alleman Hall McCoy Russell & Tuttle LLP (57) ABSTRACT

Various systems and methods are described for detecting ammonia slip. In one example method, an amount of exhaust gas recirculation is reduced when output from an exhaust gas sensor indicates an increase in nitrogen oxide above a threshold amount. When the sensor output increases above a second threshold while the exhaust gas recirculation is reduced, the sensor output is allocated to nitrogen oxide; and when the sensor output does not increase above a second threshold while the exhaust gas recirculation is reduced, the sensor output is allocated to ammonia.

19 Claims, 6 Drawing Sheets

METHODS AND SYSTEMS FOR AMMONIA SLIP DETECTION

TECHNICAL FIELD

The present application relates generally to ammonia slip detection in an exhaust gas treatment system included in an exhaust system of an internal combustion engine.

BACKGROUND AND SUMMARY

Diesel vehicles may be equipped with an exhaust gas treatment system which may include, for example, a urea based selective catalytic reduction (SCR) system and one or more exhaust gas sensors such as nitrogen oxide ($NO_x$) sensors, at least one of which may be disposed downstream of the SCR system. When the SCR system becomes loaded with urea to a point of saturation, which varies with temperature, the SCR system may begin to slip ammonia ($NH_3$). The ammonia slip from the SCR system may be detected by the $NO_x$ sensor as $NO_x$ resulting in an inaccurate $NO_x$ output which is too high. As such, an efficiency of the SCR system may be determined to be lower than it actually is.

The inventors herein have recognized the above issue and have devised an approach to at least partially address it. Thus, a method for an engine system is disclosed. The method includes, responsive to a threshold increase in $NO_x$ indicated by an exhaust gas sensor, reducing an amount of exhaust gas recirculation (EGR). The method further includes, while the amount of exhaust gas recirculation is reduced, allocating output from the sensor to each of $NH_3$ and $NO_x$ and in different amounts depending on a change in sensor output. The method further includes, adjusting one or more operating parameters based on the allocation and the change in sensor output.

By temporarily reducing the amount of EGR, $NO_x$ emission from the engine may increase. If the threshold increase in $NO_x$ is due to $NO_x$ passing through an SCR catalyst (e.g., entering an upstream end of the SCR catalyst and exiting a downstream end of the SCR catalyst) disposed upstream of the sensor, the sensor may detect an increase in $NO_x$ when the EGR is reduced. As such, the sensor output may be allocated to $NO_x$. On the other hand, if the threshold increase in $NO_x$ is due to $NH_3$ slip, the sensor output may not change (or may change less than a threshold amount) when the EGR is reduced due to reduction of $NO_x$ by $NH_3$ in the SCR catalyst. As such, the sensor output may be allocated to $NH_3$. When the sensor output is allocated to $NO_x$, one or more operating parameters, such as amount of EGR, may be adjusted to reduce the amount of $NO_x$. When the sensor output is allocated to $NH_3$, one or more operating parameters, such as urea injection amount, may be adjusted to reduce the $NH_3$ slip. In this way, errors in calculation of an efficiency of the SCR catalyst may be reduced, and the efficiency of the system may be improved and $NH_3$ slip may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods and systems for detecting ammonia (NH3) slip from a selective catalytic reduction (SCR) system. In one example, a method comprises, responsive to a threshold increase in nitrogen oxide indicated by an exhaust gas sensor, reducing an amount of exhaust gas recirculation (EGR). The method further comprises, while the amount of EGR is reduced, allocating output from the sensor to each of ammonia and nitrogen oxide and in different amounts depending on a change in sensor output. For example, when the sensor output increases above a second threshold while the EGR is reduced, the sensor output is allocated to $NO_x$, and a reduced exhaust gas treatment system efficiency condition is indicated. When the sensor output does not increase above the second threshold while the EGR is reduced, the sensor output is allocated to $NH_3$, and an $NH_3$ slip condition is indicated. In this manner, the exhaust as sensor may be used to both indicate a reduced exhaust gas treatment system efficiency and an $NH_3$ slip condition. The method further comprises adjusting one or more operating parameters based on the allocation and the change in sensor output. In one example, the amount of exhaust gas recirculation may be increased when the sensor output is allocated to $NO_x$. In another example, the amount of urea injection may be reduced when the sensor output is allocated to $NH_3$. In this way, the system may be adjusted based on the sensor such that the efficiency of the exhaust gas treatment system is improved and $NH_3$ slip is reduced.

Figure 1:
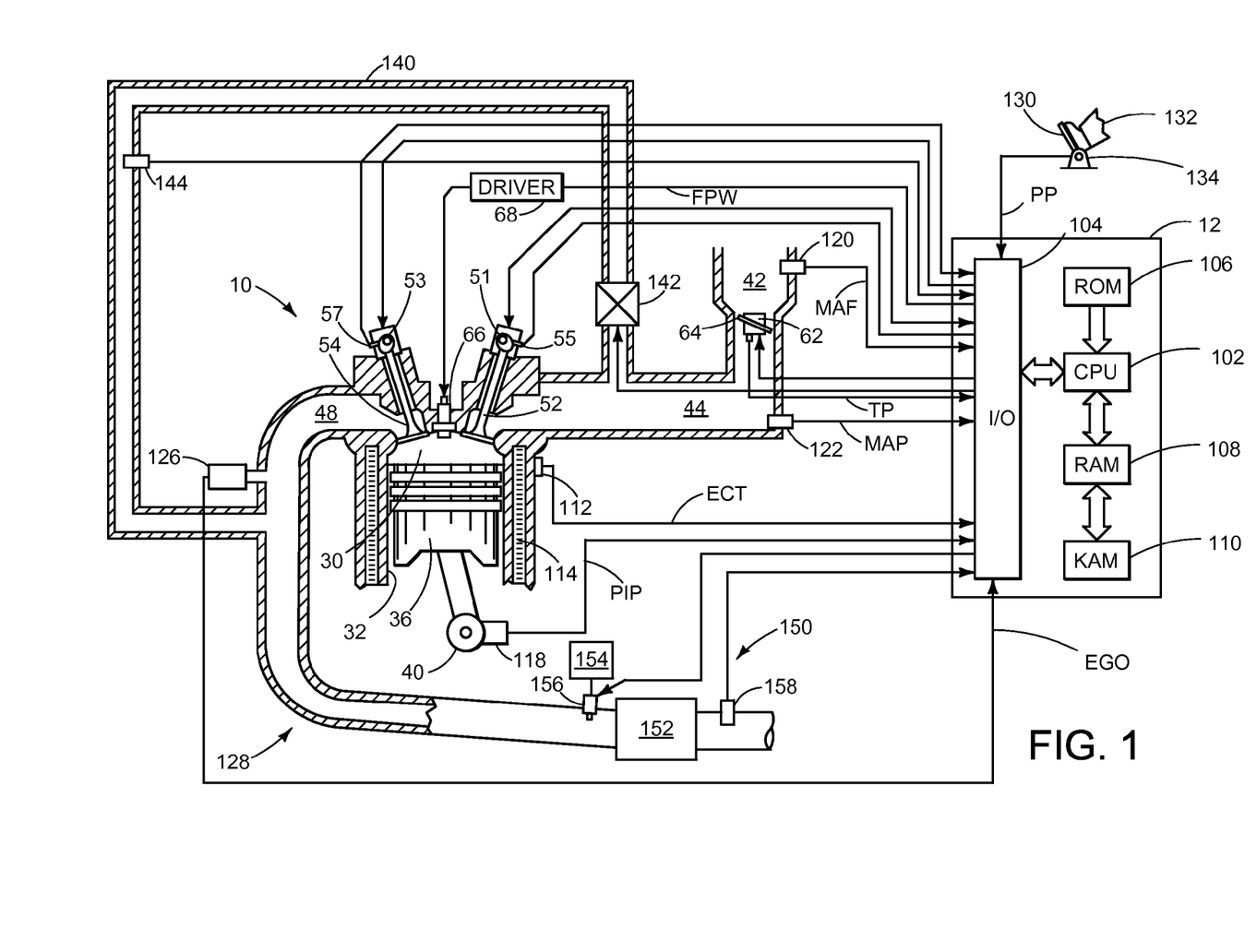
FIG. 1 shows a schematic diagram of an engine including an exhaust system with an exhaust gas treatment system.

Referring now to FIG. 1, a schematic diagram showing one cylinder of multi-cylinder engine 10, which may be included in a propulsion system of an automobile, is illustrated. The engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. The fuel injector 66 is shown coupled directly to the cylinder 30 for injecting fuel directly therein in proportion to the pulse width of signal FPW received from the controller 12 via an electronic driver 68. In this manner, the fuel injector 66 provides what is known as direct injection (hereafter also referred to as "DI") of fuel into the combustion cylinder 30.

It will be appreciated that in an alternate embodiment, the injector 66 may be a port injector providing fuel into the intake port upstream of the cylinder 30. It will also be appreciated that the cylinder 30 may receive fuel from a plurality of injectors, such as a plurality of port injectors, a plurality of direct injectors, or a combination thereof.

In one example, the engine 10 is a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 48 to the intake passage 42 via an EGR passage 140. The amount of EGR provided to the intake manifold 44 may be varied by a controller 12 via an EGR valve 142. By introducing exhaust gas to the engine 10, the amount of available oxygen for combustion is decreased, thereby reducing combustion flame temperatures and reducing the formation of $NO_x$ for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust passage 48 upstream of an exhaust gas treatment system 150. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust gas treatment system 150 is shown arranged along the exhaust passage 48 downstream of the exhaust gas sensor 126.

In the example shown in FIG. 1, the exhaust gas treatment system 150 is a urea based selective catalytic reduction (SCR) system. The SCR system includes at least an SCR catalyst 152, a urea storage reservoir 154, and a urea injector 156, for example. In other embodiments, the exhaust gas treatment system 150 may additionally or alternatively include other components, such as a particulate filter, lean $NO_x$ trap, three way catalyst, various other emission control devices, or combinations thereof. In the depicted example, the urea injector 156 provides urea from the urea storage reservoir 154. However, various alternative approaches may be used, such as solid urea pellets that generate an ammonia vapor, which is then injected or metered to the SCR catalyst 152. In still another example, a lean $NO_x$ trap may be positioned upstream of SCR catalyst 152 to generate $NH_3$ for the SCR catalyst 152, depending on the degree or richness of the air-fuel ratio fed to the lean $NO_x$ trap.

The exhaust gas treatment system 150 further includes an exhaust gas sensor 158 positioned downstream of the SCR catalyst 152. In the depicted embodiment, the exhaust gas sensor 158 may be a $NO_x$ sensor, for example, for measuring an amount of post-SCR $NO_x$. In some examples, an efficiency of the SCR system may be determined based on the exhaust gas sensor 158, for example, and further based on the exhaust gas sensor 126 (when the sensor 126 measures $NO_x$, for example) positioned upstream of the SCR system. In other examples, the exhaust gas sensor 158 may be any suitable sensor for determining an exhaust gas constituent concentration, such as a UEGO, EGO, HEGO, HC, CO sensor, etc.

The controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the sensor 122; and exhaust constituent concentration from the exhaust gas sensors 126 and 158. Engine speed signal, RPM, may be generated by controller 12 from signal PIP.

The storage medium read-only memory 106 can be programmed with non-transitory, computer readable data representing instructions executable by the processor 102 for performing the methods described below as well as other variants that are anticipated but not specifically listed.

In one example, the controller 12 may detect $NH_3$ slip based on output from the exhaust gas sensor 158, as will be described in greater detail below with reference to FIG. 2. As an example, when the sensor 158 detects a threshold increase in $NO_x$ output, the controller 12 adjusts the EGR valve 142 to reduce an amount of EGR such that $NO_x$ emission from the engine 10 increases. Based on the change in sensor output during the period of reduced EGR, the sensor output is allocated to $NO_x$ or $NH_3$. For example, if the sensor output increases, the output is allocated to $NO_x$, as increased $NO_x$ from the engine is not reduced by the SCR system. On the other hand, if the sensor output does not change by more than a threshold amount, the output is allocated to $NH_3$ and $NH_3$ slip is indicated. Based on the change in output and the allocation, the controller 12 may adjust one or more engine operating parameters. As non-limiting examples, the controller 12 may adjust the amount of EGR and/or the amount of urea injection based on the change in output and the allocation.

As described above, FIG. 1 shows only one cylinder of a multi-cylinder engine, and each cylinder may similarly include its own set of intake/exhaust valves, fuel injector, spark plug, etc.

Figure 2:
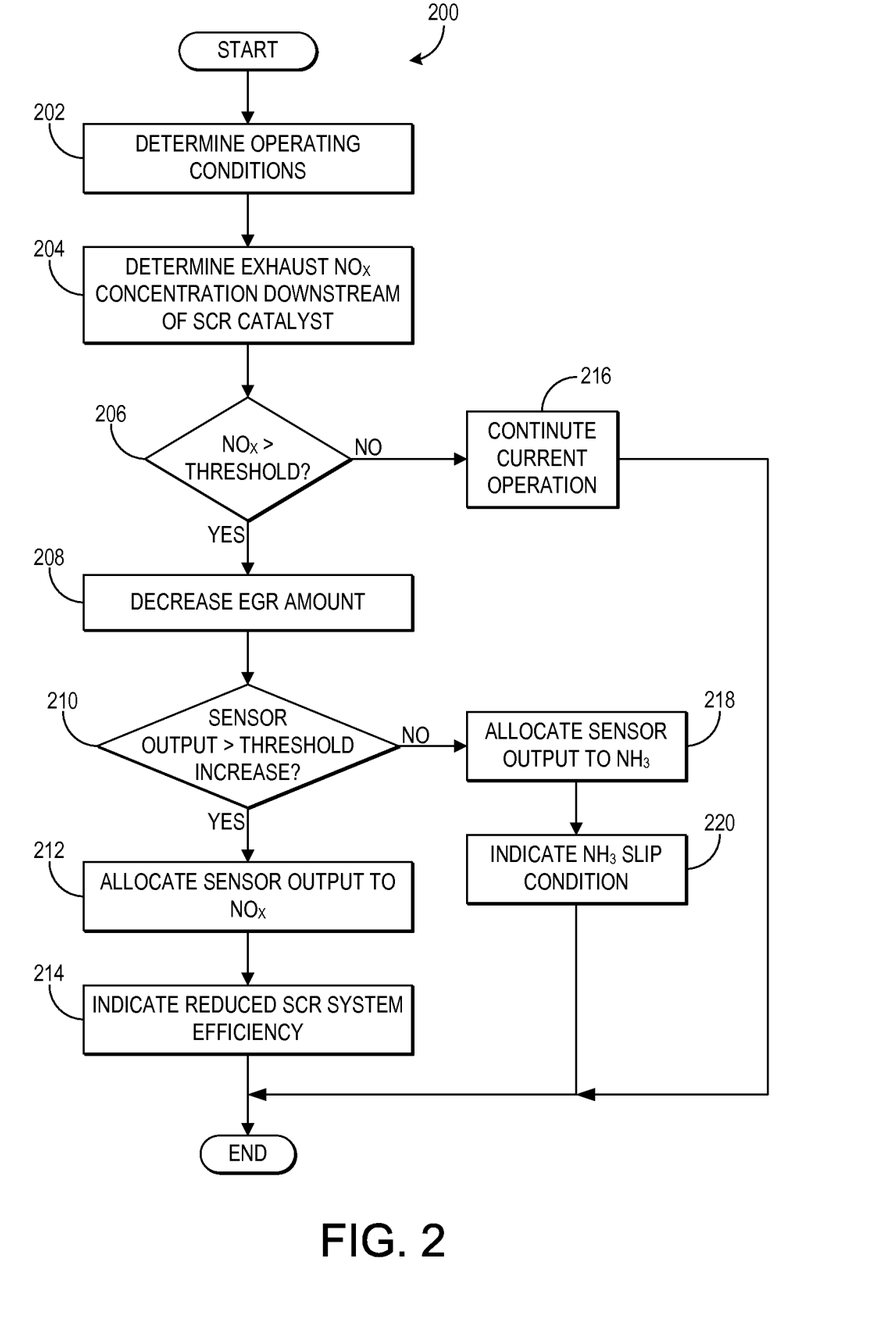
FIG. 2 shows a flow chart illustrating a routine for detecting ammonia slip in an exhaust gas treatment system.
Figure 3:
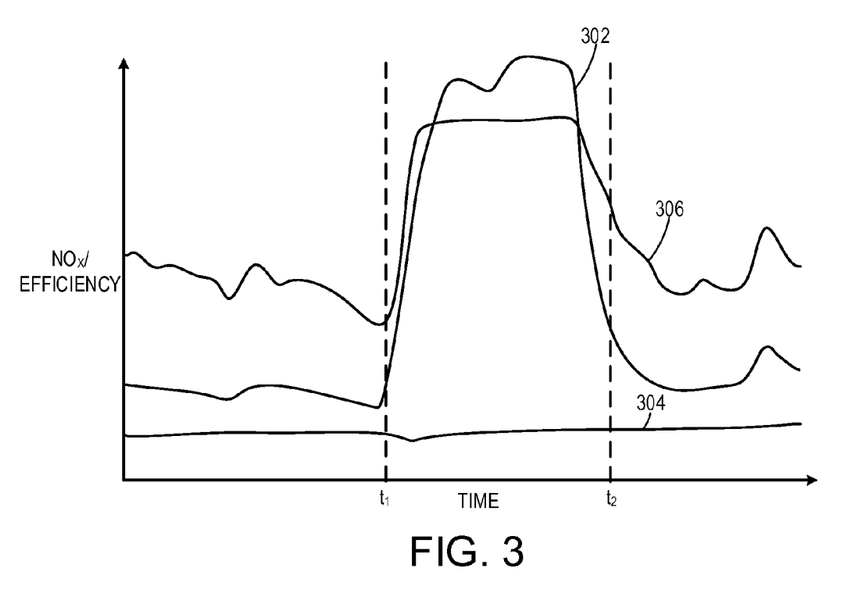
FIG. 3 shows a graph illustrating an ammonia slip condition.
Figure 4:
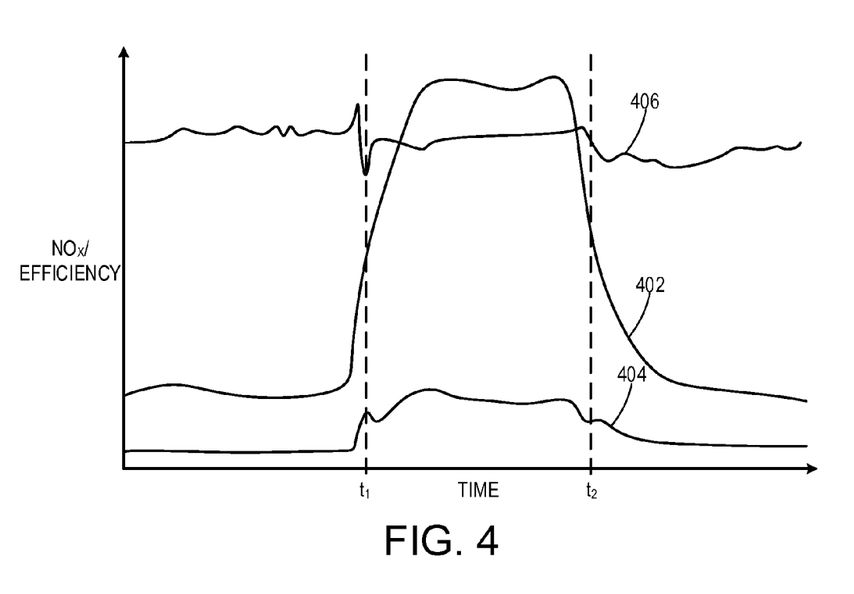
FIG. 4 shows a graph illustrating a low selective catalytic reduction system efficiency condition.
Figure 5:
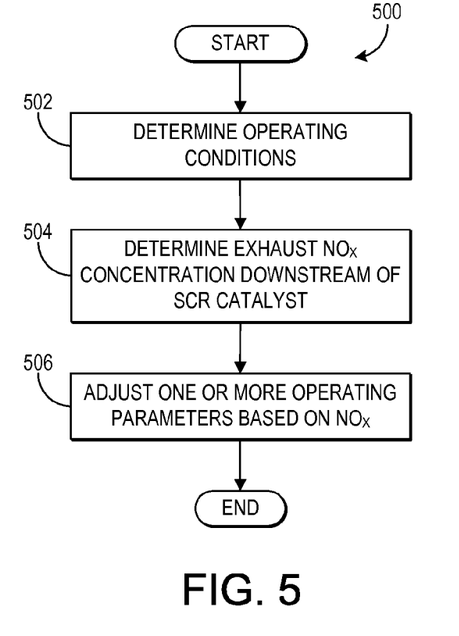
FIG. 5 shows a flow chart illustrating a routine for controlling operating parameters when an exhaust gas sensor output is allocated to nitrogen oxide.
Figure 6:
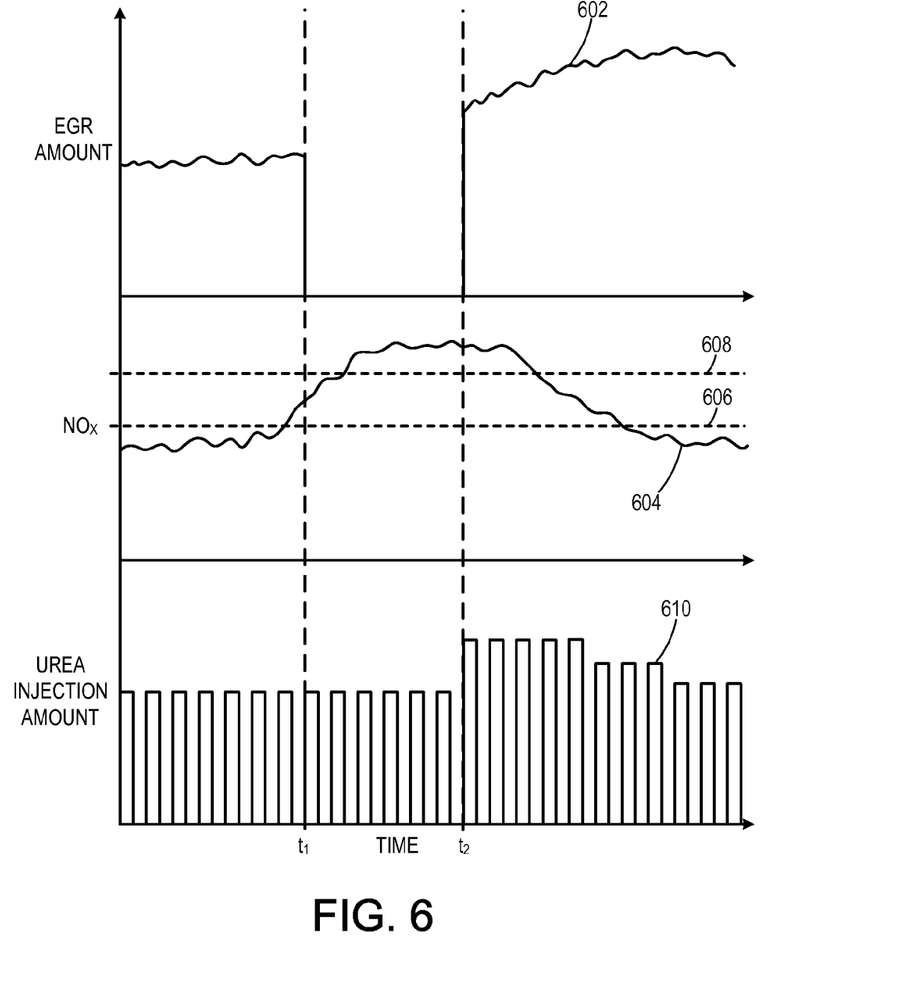
FIG. 6 shows a series of graphs illustrating operating parameters when an exhaust gas sensor output is allocated to nitrogen oxide.
Figure 7:
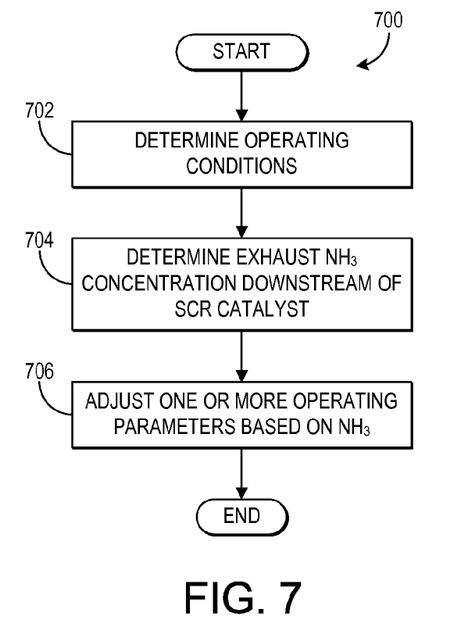
FIG. 7 shows a flow chart illustrating a routine for controlling operating parameters when an exhaust gas sensor output is allocated to ammonia.
Figure 8:
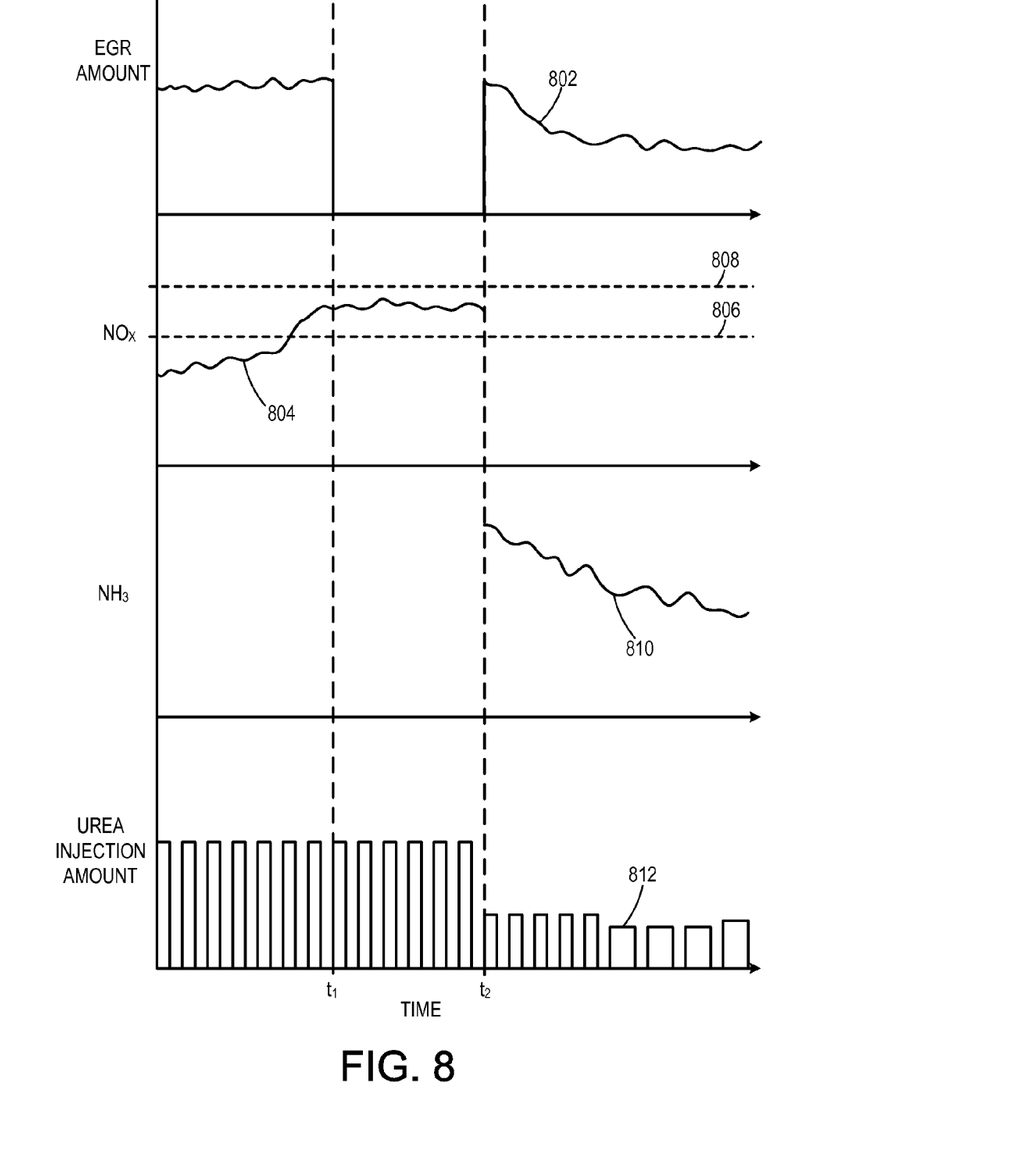
FIG. 8 shows a series of graphs illustrating operating parameters when an exhaust gas sensor output is allocated to ammonia.

FIGS. 2, 5, and 7 show flow charts illustrating routines for controlling an engine system based on an exhaust gas sensor which is part of an exhaust gas treatment system, such as the exhaust gas sensor 158 described above with reference to FIG. 1. In particular, the flow chart in FIG. 2 shows a routine for detecting $NH_3$ slip from an SCR catalyst based on output from an exhaust gas sensor disposed downstream of the SCR catalyst in the SCR system. The graph in FIG. 3 shows an example illustrating system parameters during an $NH_3$ slip condition. The graph in FIG. 4 shows an example illustrating system parameters during a low SCR system efficiency condition. Based on the sensor output during a period of reduced EGR, the sensor output may be allocated to $NO_x$ or $NH_3$. When the sensor output is allocated to $NO_x$, engine system operation may be adjusted according to the routine shown in FIG. 5. FIG. 6 shows a series of graphs illustrating system parameters when the sensor output is allocated to $NO_x$. When the sensor output is allocated to $NH_3$, engine system operation may be adjusted according to the routine shown in FIG. 7. FIG. 8 shows a series of graphs illustrating system parameters when the sensor output is allocated to $NH_3$.

Referring now to FIG. 2, a routine 200 for determining $NH_3$ slip based on an exhaust gas sensor disposed downstream of an SCR catalyst is shown. Specifically, the routine determines if $NO_x$ output from the sensor is greater than a threshold and reduces an amount of EGR responsive to an indication that $NO_x$ is greater than the threshold. Based on the sensor output during a period of reduced EGR, the sensor output may be allocated to $NO_x$ or $NH_3$.

At 202, operating conditions are determined. The operating conditions may include engine operating conditions (e.g., engine speed, engine load, amount of EGR, air fuel ratio, etc.) and exhaust gas treatment system conditions (e.g., exhaust temperature, SCR catalyst temperature, amount of urea injection, etc.).

Once the operating parameters are determined, the routine proceeds to 204 where the exhaust gas sensor output is determined. As described above, the exhaust gas sensor may be a $NO_x$ sensor which outputs an indication of a concentration of $NO_x$ in the exhaust stream downstream of the SCR catalyst.

At 206, it is determined if the amount of $NO_x$ indicated by the sensor output is greater than a threshold amount. The threshold amount may be an amount of $NO_x$ that indicates an efficiency, or a $NO_x$ conversion efficiency, of the system is low, for example. In some embodiments, the amount of post-SCR $NO_x$ (e.g., $NO_x$ downstream of the SCR catalyst) may be compared with an amount of pre-SCR $NO_x$ (e.g., $NO_x$ upstream of the SCR catalyst) in order to determine an efficiency of the system, for example.

If it is determined that the amount of $NO_x$ is less than the threshold, the routine moves to 216 and current operation is continued. On the other hand, if it is determined that the amount of $NO_x$ is greater than the threshold amount, the routine continues to 208 and an amount of EGR is reduced. In some examples, EGR may be turned off such that exhaust gas is not routed to the intake manifold there is no EGR. In other examples, the amount of EGR may be reduced by an amount dependent on operating conditions, for example. The amount of EGR may be reduced for a predetermined duration. As one non-limiting example, EGR may be reduced for 5 seconds. In other examples, EGR may be reduced for more than 5 seconds or less than 5 seconds.

At 210, it is determined if there is a threshold increase in sensor output. For example, the threshold may correspond to an increase in $NO_x$ that indicates an efficiency of the SCR system is too low and not enough $NO_x$ is being reduced by the SCR system.

If it is determined that the sensor output is less than the threshold (e.g., the change in output is relatively small or there is a decrease in sensor output), the routine moves to 218 and the sensor output is allocated to $NH_3$. At 220, an $NH_3$ slip condition is indicated. For example, when the amount of EGR is reduced, $NO_x$ emission from the engine increases. During an $NH_3$ slip condition, the excess $NO_x$ is reduced by the SCR catalyst. Thus, when $NO_x$ emission from the engine increases, the sensor output may not change or only changes a relatively small amount, as the increased $NO_x$ is reduced by the $NH_3$ in the SCR catalyst.

FIG. 3 shows a graph illustrating the $NH_3$ slip condition. A curve 302 shows the amount of pre-SCR $NO_x$, such as an amount of $NO_x$ measured by the sensor 126 described above with reference to FIG. 1. As depicted, during a period when the amount of EGR is reduced, the amount of pre-SCR $NO_x$ significantly increases. A curve 304 shows the amount of post-SCR $NO_x$, such as an amount of $NO_x$ measured by the sensor 158 described above with reference to FIG. 1. During the period when the amount of EGR is reduced, the amount of post-SCR $NO_x$ remains substantially the same. As such, the efficiency of the SCR system, indicated by a curve 306, significantly increases during the period when EGR is reduced due to the increase in $NO_x$ reduction by the SCR catalyst resulting from excess $NH_3$ in the catalyst.

Continuing with FIG. 2, on the other hand, if it is determined that the sensor output is greater than the threshold, the routine proceeds to 212 and the sensor output is allocated to $NO_x$. For example, because there is more $NO_x$ and the SCR catalyst is not slipping $NH_3$ (e.g., there is not an excess of $NH_3$ in the SCR catalyst), a greater amount of $NO_x$ may pass through the SCR catalyst without being reduced. As such, the sensor output increases due to the increased amount of $NO_x$ passing through the SCR catalyst. Thus, at 214, a reduced SCR system efficiency is indicated.

FIG. 4 shows a graph illustrating the reduced SCR system efficiency condition. A curve 402 shows the amount of pre-SCR $NO_x$, such as an amount of $NO_x$ measured by the sensor 126 described above with reference to FIG. 1. As depicted, during a period when the amount of EGR is reduced, the amount of pre-SCR $NO_x$ significantly increases. A curve 404 shows the amount of post-SCR $NO_x$, such as an amount of $NO_x$ measured by the sensor 158 described above with reference to FIG. 1. During the period when the amount of EGR is reduced, the amount of post-SCR $NO_x$ increases. As such, the efficiency of the SCR system, indicated by a curve 406, remains substantially the same, or even decreases slightly, during the period when EGR is reduced due to the increased amount of $NO_x$ entering the SCR catalyst and not enough $NH_3$ to reduce it.

Continuing to FIG. 5, a routine for adjusting system operation based on the allocation of sensor output to $NO_x$ is shown. Specifically, the routine determines an exhaust $NO_x$ concentration downstream of the SCR catalyst and adjusts one or more operating parameters based on the sensor output.

At 502, operating conditions are determined. As described above, the operating conditions may include engine operating conditions (e.g., engine speed, engine load, amount of EGR, air fuel ratio, etc.) and exhaust gas treatment system conditions (e.g., exhaust temperature, SCR catalyst temperature, amount of urea injection, etc.).

Once the operating conditions are determined, the routine proceeds to 504 and the exhaust $NO_x$ concentration downstream of the SCR catalyst is determined based on the exhaust gas sensor output.

At 506, one or more operating parameters are adjusted based on the $NO_x$ concentration. As non-limiting examples, the operating parameters may include amount of EGR and amount of urea injection. For example, the amount of EGR may be increased by an amount corresponding to the change in $NO_x$ amount above the threshold amount. By increasing the amount of EGR, less $NO_x$ may be emitted by the engine resulting in a reduced amount of $NO_x$ passing through the SCR catalyst. As another example, the amount of urea injection may be increased by an amount corresponding to the change in $NO_x$ amount about the threshold amount and a temperature of the SCR catalyst. The amount of urea injection may be increased by changing the pulsewidth or duration of the urea injection, for example. By increasing the amount of urea injected to the SCR catalyst, a greater amount of $NO_x$ may be reduced by the catalyst, thereby reducing the amount of $NO_x$ which passes through the catalyst. In other examples, a combination of amount of EGR and amount of urea injection may be adjusted.

FIG. 6 shows a series of graphs illustrating a condition in which the efficiency of the SCR system is low, such as when the exhaust gas sensor output is allocated to $NO_x$. As depicted, the amount of EGR 602 is decreased at a time $t_1$ responsive to an increase in $NO_x$ output 604 above a threshold level 606. In the depicted example, the amount of EGR is reduced such that there is no EGR for a period between times $t_1$ and $t_2$. In other examples, the amount of EGR may be reduced such that there is some EGR. As shown, while the amount of EGR is reduced, the $NO_x$ output 604 increases above a second threshold 608, thus indicating a low SCR system efficiency. At time $t_2$, the amount of EGR is increased to an amount greater than before time $t_1$ in order to reduce an amount of $NO_x$ emission from the engine. Further, an amount of $NH_3$ 610 injected to the SCR catalyst is increased in order to increase $NO_x$ reduction in the catalyst. In this manner, the efficiency of the SCR system may be increased.

In other examples, only the amount of EGR may be increased or only the amount of urea injected to the SCR catalyst may be adjusted. In still other examples, one or more other operating parameters may be additionally or alternatively adjusted. Thus, when the sensor output increases above a second threshold when the amount of EGR is reduced, the sensor output is allocated to $NO_x$, and a low SCR system efficiency is indicated. As such, one or more operating parameters are adjusted in order to increase the efficiency of the system.

Continuing to FIG. 7, a routine for adjusting system operation based on the allocation of sensor output to $NH_3$ is shown. Specifically, the routine determines an exhaust $NH_3$ concentration downstream of the SCR catalyst and adjusts one or more operating parameters based on the sensor output.

At 702, operating conditions are determined. As described above, the operating conditions may include engine operating conditions (e.g., engine speed, engine load, amount of EGR, air fuel ratio, etc.) and exhaust gas treatment system conditions (e.g., exhaust temperature, SCR catalyst temperature, amount of urea injection, etc.).

Once the operating parameters are determined, the routine continues to 704 and the exhaust $NH_3$ concentration downstream of the SCR catalyst is determined based on the exhaust sensor output.

At 706, one or more operating parameters are adjusted based on the $NH_3$ concentration. As non-limiting examples, the operating parameters may include amount of urea injection and amount of EGR. For example, the amount of urea injection may be reduced such that an amount of excess $NH_3$ which slips from the SCR catalyst is reduced. As described above, the amount of urea injection may be increased by changing the pulsewidth or duration of the urea injection. As another example, the amount of EGR may be reduced. For example, by reducing the amount of EGR, a greater amount of $NO_x$ may be emitted from the engine. The increased $NO_x$ may be reduced by the excess $NH_3$ in the SCR catalyst, thereby reducing the amount of $NO_x$ which passes through the SCR catalyst.

The amount the operating parameters are adjusted may be further based on a temperature of the SCR catalyst, as the point of urea saturation of the catalyst varies with temperature. For example, when the temperature of the catalyst is a relatively higher temperature, the amount of EGR may be reduced less and/or the amount of urea injection may be reduced by a smaller amount. In contrast, when the temperature of the catalyst is a relatively lower temperature, the amount of EGR may be increased more and/or the amount of urea injection may be reduced by a larger amount.

FIG. 8 shows a series of graphs illustrating an $NH_3$ slip condition, such as when the exhaust gas sensor output is allocated to $NH_3$. As depicted, the amount of EGR 802 is decreased at a time $t_1$ responsive to an increase in $NO_x$ output 804 above a threshold level 806. In the depicted example, the amount of EGR is reduced such that there is no EGR for a period between times $t_1$ and $t_2$. In other examples, the amount of EGR may be reduced such that there is some EGR. As shown, while the amount of EGR is reduced, the $NO_x$ output 804 does not increase above a second threshold 808, thus indicating the SCR system does not have a low efficiency and the increased sensor output is due to $NH_3$ slip. At time $t_2$, the amount of EGR is increased to an amount less than before time $t_1$ in order to increase an amount of $NO_x$ emission from the engine. Further, an amount of $NH_3$ 812 injected to the SCR catalyst is decreased in order to decrease an amount of $NH_3$ in the catalyst. In this manner, the $NH_3$ slip from the catalyst may be reduced. As shown, the sensor output is allocated to NH$_3$ 810 and the amount of NH$_3$ decreases after time t$_2$.

In other examples, only the amount of EGR may be decreased or only the amount of urea injected to the SCR catalyst may be increased. In still other examples, one or more other operating parameters may be additionally or alternatively adjusted. Thus, when the sensor output does not increase above a second threshold while the amount of EGR is reduced, the sensor output is allocated to NH$_3$, and an NH$_3$ slip condition is indicated. As such, one or more operating parameters are adjusted in order to reduce the NH$_3$ slip.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method, comprising:
    responsive to a threshold increase in nitrogen oxide indicated by an exhaust gas sensor, disabling exhaust gas recirculation (EGR) while repeatedly injecting urea at least more than twice, an amount of urea in each injection maintained while EGR is disabled;
    while an amount of exhaust gas recirculation is reduced, allocating output from the sensor to each of ammonia and nitrogen oxide and in different amounts depending on a change in sensor output; and
    adjusting one or more operating parameters based on the allocation and the change in sensor output.

2. The method of claim 1, wherein the sensor is a nitrogen oxide sensor.

3. The method of claim 1, wherein reducing the amount of EGR includes turning off EGR.

4. The method of claim 1, wherein the one or more operating parameters include the amount of EGR, and further comprising increasing the amount of EGR when the sensor output is allocated to nitrogen oxide.

5. The method of claim 1, wherein the one or more operating parameters include an amount of urea injection to a selective catalytic reduction catalyst disposed upstream of the sensor, and further comprising reducing the amount of urea injection when the sensor output is allocated to ammonia.

6. The method of claim 1, further comprising indicating an efficiency of a selective catalytic reduction system based on the sensor output.

7. The method of claim 1, wherein adjusting the one or more operating parameters further includes adjusting the one or more operating parameters based on a temperature of a selective catalytic reduction catalyst disposed upstream of the exhaust gas sensor.

8. The method of claim 1, wherein when the sensor output increases greater than a second threshold amount while the amount of EGR is reduced, allocating the sensor output to nitrogen oxide.

9. The method of claim 8, further comprising indicating a reduced efficiency of a selective catalytic reduction catalyst positioned upstream of the sensor when the sensor output is allocated to nitrogen oxide.

10. The method of claim 1, wherein when the sensor output does not change by a second threshold amount while the amount of EGR is reduced, allocating the sensor output to ammonia.

11. The method of claim 10, further comprising indicating an ammonia slip condition when the sensor output is allocated to ammonia.

12. A method, comprising:
    responsive to a first threshold increase in nitrogen oxide indicated by an exhaust gas sensor, reducing an amount of exhaust gas recirculation while repeatedly injecting an amount of urea;
    while the amount of exhaust gas recirculation is reduced:
        allocating sensor output to ammonia when the sensor output changes by less than a second threshold amount; and
        allocating sensor output to nitrogen oxide and indicating a reduced efficiency of a selective catalytic reduction catalyst disposed upstream of the sensor when the sensor output increases by greater than the second threshold amount; and
    adjusting one or more operating parameters based on the allocation and the sensor output.

13. The method of claim 12, further comprising indicating an ammonia slip condition when the sensor output is allocated to ammonia.

14. The method of claim 12, wherein the one or more operating parameters include the amount of exhaust gas recirculation and an amount of urea injection.

15. The method of claim 14, wherein adjusting the one or more operating parameters includes increasing the amount of exhaust gas recirculation and increasing the amount of urea injection when the sensor output is allocated to nitrogen oxide.

16. The method of claim 14, wherein adjusting the one or more operating parameters includes reducing the amount of exhaust gas recirculation and reducing the amount of urea injection when the sensor output is allocated to ammonia.

17. A system, comprising:
    an engine with an exhaust system;

an exhaust gas recirculation system coupled between the engine and the exhaust system:

an exhaust treatment system disposed in the exhaust system and including a selective catalytic reduction catalyst, a urea injector disposed upstream of the catalyst, and an exhaust gas sensor disposed downstream of the catalyst; and a control system in communication with the sensor, the control system including non-transitory instructions to turn off exhaust gas recirculation while repeatedly injecting urea, at least more than twice, with a maintained amount of urea injection responsive to sensor output exceeding a threshold amount of nitrogen oxide, and, while exhaust gas recirculation is turned off, allocating output from the sensor to each of ammonia and nitrogen oxide and in different amounts depending on a change in sensor output, and adjusting one or more operating parameters based on the allocation and the change in sensor output.

18. The system of claim 17, wherein the one or more operating parameters include the amount of exhaust gas recirculation and an amount of urea injection, and, when the sensor output is allocated to nitrogen oxide, the control system is configured to increase the amount of exhaust gas recirculation and increase the amount of urea injection.

19. The system of claim 17, wherein the one or more operating parameters include the amount of exhaust gas recirculation and an amount of urea injection, and, when the sensor output is allocated to ammonia, the control system is configured to reduce the amount of exhaust gas recirculation and reduce the maintained amount of urea injection.

* * * * *